US009007425B1

(12) United States Patent
Simon (10) Patent No.: US 9,007,425 B1
(45) Date of Patent: Apr. 14, 2015

(54) SOFTWARE-CONTROLLED LIGHTING FOR VIDEO VISITATION DEVICES

(75) Inventor: Jimmy Simon, Deux-Montagnes (CA)

(73) Assignee: Securus Technologies, Inc., Dallas, TX (US)

( * ) Notice: Subject to any disclaimer, the term of this patent is extended or adjusted under 35 U.S.C. 154(b) by 186 days.

(21) Appl. No.: 13/600,214

(22) Filed: Aug. 31, 2012

(51) Int. Cl.
*H04N 7/14* (2006.01)
*H04N 7/18* (2006.01)

(52) U.S. Cl.
CPC .................................. *H04N 7/18* (2013.01)

(58) Field of Classification Search
USPC ...................... 348/14.01, 14.12, 14.08, 14.05
See application file for complete search history.

(56) References Cited

U.S. PATENT DOCUMENTS

| | | | |
|---|---|---|---|
| 7,256,816 B2 * | 8/2007 | Profanchik et al. | 348/14.09 |
| 7,529,357 B1 * | 5/2009 | Rae et al. | 379/189 |
| 8,189,096 B2 * | 5/2012 | Azar et al. | 348/370 |
| 8,428,644 B1 * | 4/2013 | Harooni | 455/550.1 |
| 8,553,103 B1 * | 10/2013 | Samadani et al. | 348/223.1 |
| 2004/0252184 A1 * | 12/2004 | Hesse et al. | 348/14.01 |
| 2007/0146494 A1 * | 6/2007 | Goffin et al. | 348/222.1 |
| 2008/0273079 A1 * | 11/2008 | Campbell et al. | 348/14.08 |
| 2008/0297611 A1 * | 12/2008 | Qiu et al. | 348/211.3 |
| 2010/0118179 A1 * | 5/2010 | Ciudad et al. | 348/371 |
| 2011/0249072 A1 * | 10/2011 | Marks | 348/14.1 |
| 2012/0204029 A1 * | 8/2012 | Trabucco | 713/168 |
| 2013/0194377 A1 * | 8/2013 | Humphries | 348/14.08 |
| 2013/0194775 A1 * | 8/2013 | Geddes et al. | 362/11 |

* cited by examiner

*Primary Examiner* — Olisa Anwah
(74) *Attorney, Agent, or Firm* — Fogarty, L.L.C.

(57) ABSTRACT

Systems and methods for providing software-controlled lighting for video visitation devices are disclosed. In some embodiments, a method may include receiving a message over a network indicating that a video visitation session is being established between at least a first user and a second user, and illuminating at least one of the users in response to the message and/or independently of a physical position of a telephone handset or the like. The method may also include detecting a security violation in one or more video images captured during the video visitation session, where the security violation includes the presence of one or more of: gesturing, signing, or an object. The method may further include determining an amount of lighting to be emitted by a lighting device as a function of the security violation, and controlling the lighting device to produce the determined amount of lighting.

15 Claims, 4 Drawing Sheets

SOFTWARE-CONTROLLED LIGHTING FOR VIDEO VISITATION DEVICES

TECHNICAL FIELD

This specification relates to systems and methods for providing software-controlled lighting for video visitation devices.

BACKGROUND

In the United States, prison inmates have certain visitation rights. By allowing prisoners to have some contact with the outside world while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including videoconferences and online chat sessions. The duration and frequency of these visitations may depend upon the prison's rules, regulations, or the like. Generally speaking, inmate visitation may be supervised or unsupervised. At the time of a scheduled video visitation, for example, an officer may physically move the inmate from his or her cell or to a visitation device or station in a designated area within the correctional facility, where he or she may be able to conduct the communication with a non-resident of that facility. When the visitation is over, the officer may then escort the inmate back to his or her cell.

The inventor hereof has discovered, however, that in many cases poor lighting conditions in the video visitation areas typically yield very low quality images. In many cases, the low quality may be attributed to poor lighting conditions in the facility's visitation areas. Unlike non-residents participating in a video visitation session, inmates have little (if any) control over their own environment—e.g., there may be insufficient artificial light, no windows or natural light, etc. For these and other reasons, the inventor hereof has developed various systems and methods of software-controlled lighting for video visitation devices as described herein.

SUMMARY

Embodiments disclosed herein are directed to systems and methods for providing software-controlled lighting for video visitation devices. In an illustrative, non-limiting embodiment, a method may include receiving a message over a network indicating that a video visitation session is being established between at least a first user and a second user, and illuminating at least one of the users in response to the message. For example, the network may include an Internet Protocol (IP) network or an Integrated Services Digital Network (ISDN). Also, the message may include or may be accompanied by a video or audio packet, and illuminating the at least one of the users may include activating one or more light-emitting diode (LEDs). For instance, illuminating the at least one of the users may include progressively illuminating the user from a first lighting level to a second lighting level through one or more intermediate levels, the second lighting level providing more illumination than the first lighting level.

In some implementations, the method may include detecting an amount of ambient light present in a video visitation area and, in response to the detection, determining an amount of lighting to be emitted by a lighting device during the video visitation session. The method may also include controlling the lighting device to produce the determined amount of lighting. For example, detecting the amount of ambient light present in the video visitation area may occur at least in part in response to a determination that the first user has picked up a handset operably coupled to the computer-based video visitation system. The method may also include receiving a request from the second user to increase or decrease the illumination of the first user and, in response to the request, increasing or decreasing the illumination.

In some cases, the first user may be at least one resident of a controlled-environment facility, and the second user may be at least one non-resident of the controlled-environment facility. Alternatively, the first user may be at least one non-resident of the controlled-environment facility and the second user may be at least one resident of a controlled environment facility. The method may further include detecting a security violation in one or more video images captured during the video visitation session, where the security violation includes the presence of one or more of: gesturing, signing, or an object, determining an amount of lighting to be emitted by a lighting device as a function of the security violation, and controlling the lighting device to produce the determined amount of lighting.

In another illustrative, non-limiting embodiment, a method may include making a software-based determination that a video visitation session is being established between at least one inmate of a correctional facility and at least one non-resident of the correctional facility, and providing a first amount of lighting to illuminate the at least one inmate in response to the software-based determination. The method may also include providing a second amount of lighting to illuminate the at least one inmate in response to a request from the at least one non-resident, where the second amount of lighting is different from the first amount of lighting. The method may further include receiving an identification of at least one of the at least one inmate or the at least one non-resident, and the first amount of lighting may be determined based, at least in part, upon the received identification. The method may also include detecting one or more video images captured during the video visitation session and, in response to the detection, provide a second amount of lighting different from the first amount of lighting. For example, the one or more video images may indicate the presence of one or more of: gesturing by the at least one inmate, gesturing by the at least one non-resident, signing by the at least one inmate, or signing by the at least one non-resident.

In yet another illustrative, non-limiting embodiment, a method may include determining that a video visitation session is being set up between at least one inmate within a correctional facility and at least one non-resident party outside of the correctional facility, where the determination is made independently of a physical position of a telephone handset operably coupled to the computer-based video visitation system, and illuminating the at least one inmate in response to the determination. Additionally or alternatively, the method may include changing the illumination of the at least one inmate in response to a command from the non-resident party. Additionally or alternatively, the method may include changing the illumination of the at least one inmate in response to an identity of the at least one inmate or the at least one non-resident party. Additionally or alternatively, the method may include changing the illumination of the at least one inmate in response one or more video images captured during the video visitation session indicating a correctional facility security violation.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

BRIEF DESCRIPTION OF THE DRAWINGS

Reference will now be made to the accompanying drawings.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

This specification discloses systems and methods for providing software-controlled lighting for video visitation devices. Generally speaking, the various techniques described herein may find applicability in a wide variety of controlled-environment facilities (as well as outside of controlled-environment facilities). Examples of controlled-environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities. For instance, in some of the embodiments discussed below, a controlled-environment facility may be referred to as a jail or prison, and its residents may be referred to as residents, arrestees, detainees, or inmates. It should be understood, however, that the systems and methods described herein may be similarly applicable to other types of controlled-environment facilities and their respective residents (e.g., a hospital and its patients).

Figure 1:
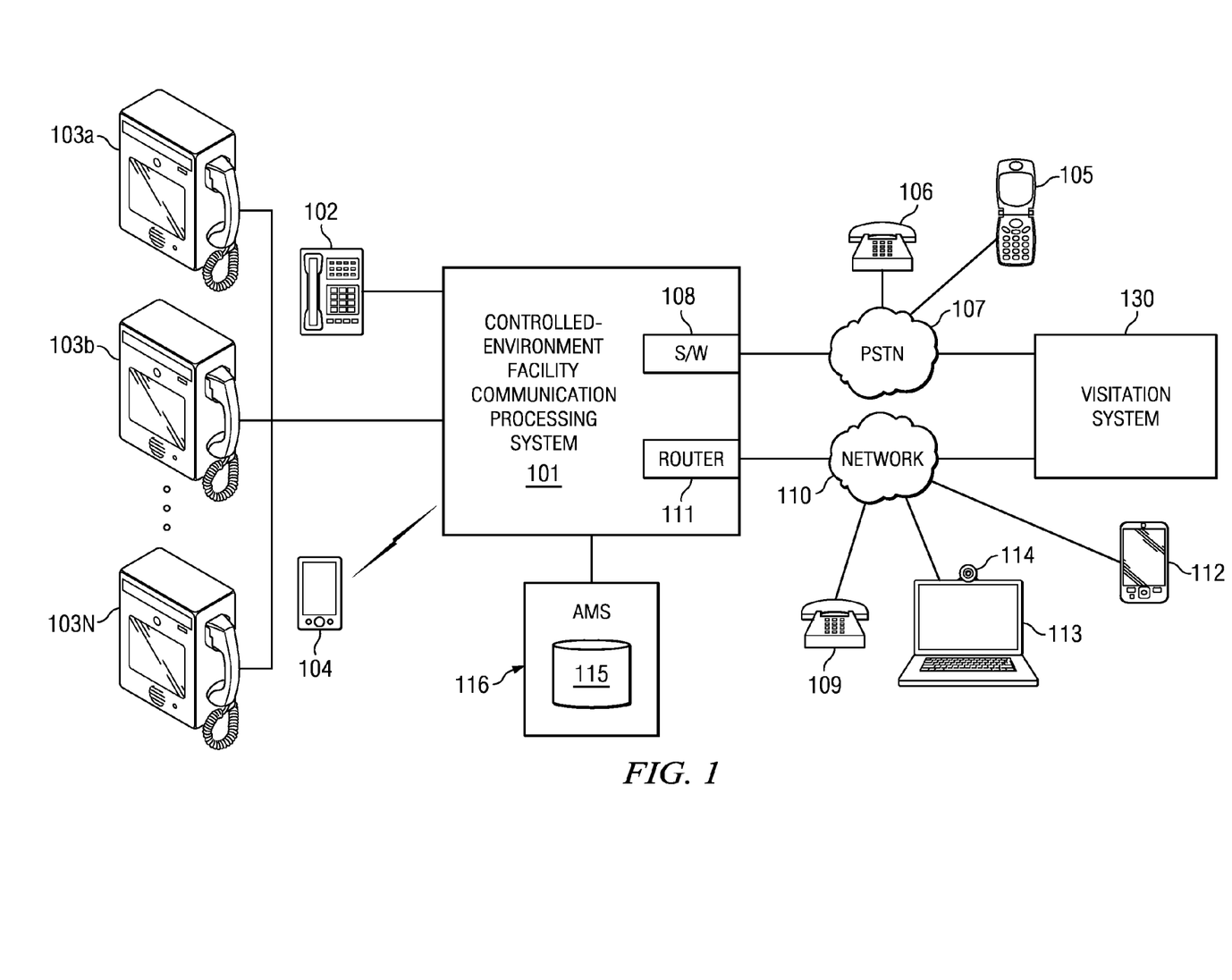
FIG. 1 is a block diagram of an environment where a visitation system may be employed according to some embodiments.

Turning now to FIG. 1, a block diagram of an illustrative environment where a visitation system may be employed is depicted according to some embodiments. As shown, communication processing system 101 may provide telephone services, videoconferencing, online chat, and other communication services to a controlled-environment facility. For example, in some cases, communication system 101 may be co-located with a controlled-environment facility. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of a controlled-environment facility.

In the context of a correctional facility, for instance, inmates may use telephones 102 to access certain communication services. In some facilities, inmates may also use a personal computer wireless device 104 to access such services. For example, an inmate may initiate telephone services by lifting the receiver on telephone 102, at which time the inmate may be prompted to provide a personal identification number (PIN), other identifying information or biometrics. An interactive voice response (IVR) unit (not shown) may generate and play prompt or other messages to inmates on devices 102 and/or 104.

Under the control of communication processing system 101, devices 102 and 104 may be capable of connecting to a non-resident's (i.e., a person not committed to a controlled-environment facility) telephone 106 or device 105 across a publicly switched telephone network (PSTN) 107. For example, telephone 106 may be located at a non-resident's home, inmate visitation center, etc. Switch 108 in communication processing system 101 may be used to connect calls across PSTN 107. Additionally or alternatively, the non-resident may be at telephone 109 or device 112, which is on an Integrated Services Digital Network (ISDN), Voice-over-IP (VoIP), or packet data network 110, such as, for example the Internet. Router 111 of communication system 101 is used to route data packets associated with a call connection to destination telephone 109.

Video visitation devices 103a-n (each collectively referred to as "video visitation device 103") may have video conferencing capabilities to enable inmates to participate in video visitation sessions with non-residents of the correctional facility via video call, secure online chat, etc. For example, a non-resident party may have a personal or laptop computer 113 with camera 114 (or a cell phone, tablet computer, etc.). A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards. Generally speaking, each video visitation device 103 may be disposed in a visitation area of the controlled-environment facility. As noted above, poor lighting conditions in the video visitation areas typically yield very low quality images. In many cases, the inventor hereof has attributed such low quality to poor lighting conditions in the facility's visitation areas, where inmates have little (if any) control over their own environment. For these and other reasons, the inventor hereof has developed various systems and methods of software-controlled lighting for video visitation devices 103, as described in more detail in connection with FIGS. 2-5 below.

In addition to providing certain visitation and communication operations, communication processing system 101 may attempt to ensure that an inmate's calls, video conferences, online chats, etc. are performed only with non-residents whose identities, devices, email addresses, phone numbers, etc. are listed in that inmate's Pre-Approved Contact (PAC) list. Each inmate's PAC list may be stored, for example, in database 115 maintained by an Administration and Management System (AMS) 116. In addition to PAC list(s), AMS 116 may also store inmate or resident profile data (RPD), as well as visitation rules applicable to each inmate. As an example, in the context of a correctional facility, database 115 may include information such as balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

In some embodiments, database 115 may also indicate a personalized level of lighting that should be provided to a particular inmate during the inmate's video visitation sessions depending, for example, upon who the identit(ies) of the inmate and/or the non-resident. Such personalized lighting levels may be configured according to the facility's goals.

Visitation system 130 may be configured to provide, schedule, and manage visitation services to residents and non-residents of a controlled-environment facility. To that end, visitation system 130 may be coupled to PSTN 107 and/or network 110 in a manner similar to communication processing system 101 by also including one or more switches and/or routers (not shown). Accordingly, visitation system 130 may be configured to communicate with one or more residents of the controlled-environment facility via devices 102-104 and with one or more non-residents via devices 105, 106, 109, 112, and/or 113. Although visitation system 130 is shown in FIG. 1 as being remotely located with respect to communication processing system 101 and the controlled-environment facility, in other cases visitation system 130 may be co-located with the facility and/or integrated within system 101.

In some implementations, communication system 101 may be configured to perform video visitation monitoring operations configured to monitor and or record video visitations (e.g., as video files). In scenarios where communication system 101 is located within the controlled-environment facility, it may have direct access to AMS 116. In other embodiments, however, communication system 101 may be located remotely with respect to the controlled-environment facility, and access to AMS 116 may be obtained via a computer network such as, for example Network 110.

Figure 2:
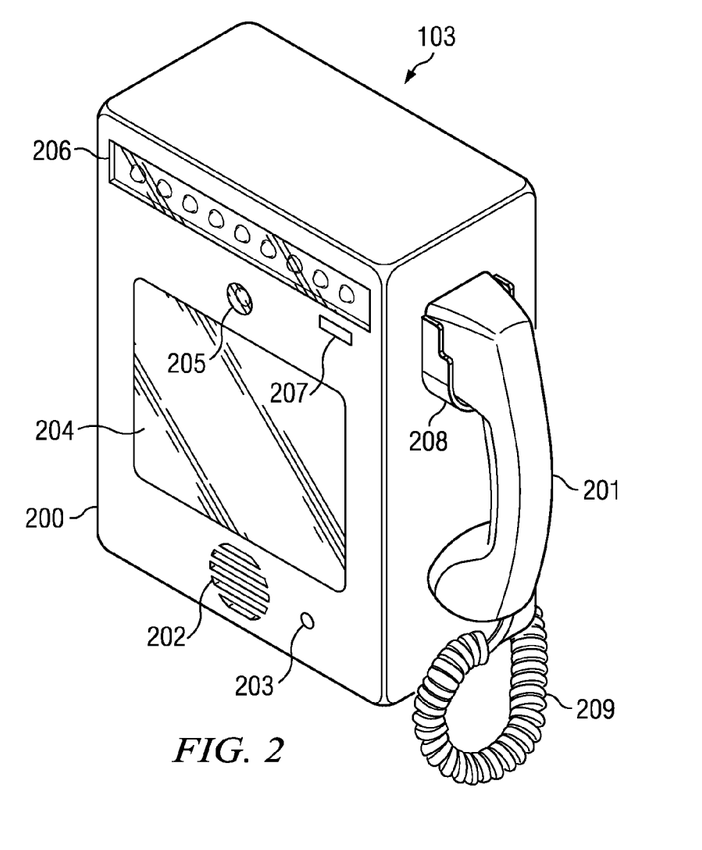
FIG. 2 is a diagram of a video visitation device according to some embodiments.

FIG. 2 is a diagram of a video visitation device 103. In some embodiments, device 103 may be implemented as a computer-based system such as described in connection with FIG. 4. As illustrated, device 103 includes display 204, camera 205, and handset 201 coupled to device 103 via wire 209. Display 204 may be any suitable electronic display such as, for example, a Liquid Crystal Display (LCD), a touchscreen display (e.g., resistive, capacitive, etc.), or the like, whereas camera 205 may be an suitable imaging device such as, for instance, a video camera or webcam equipped with Charge-Coupled Devices (CCDs), Complementary Metal-Oxide-Semiconductor (CMOS) active pixel sensors, etc. Handset 201 may be similar to a traditional telephone handset including an earpiece portion (with a loudspeaker), a handle portion, and a mouthpiece portion (with a microphone).

During a video visitation session, video visitation device 103 may be configured to capture a video image of an inmate to be transmitted to a non-resident using camera 205, and to display a video image of the non-resident to the inmate using display 204. Video visitation device 103 may also be configured to capture an audio signal from the inmate to be transmitted to the non-resident using the mouthpiece portion of handset 201, and to provide an audio signal from the non-resident to the inmate using the earpiece portion of handset 201. Additionally or alternatively, audio received from the non-resident may be reproduced via loudspeaker 202, and audio provided by the inmate may be captured via microphone 203. In some embodiments, handset holder or holster 208 may be configured to allow a user to securely rest handset 201 against device 103 (e.g., in its "off" position) when device 103 is not in use. Furthermore, handset holder 208 may include a mechanical or electromechanical switch or sensor (not shown) that senses when handset 201 is its not resting against it (e.g. in its "on" position).

Video visitation device 103 may also include lighting device 206 and lighting sensor 207. In some embodiments, lighting device 206 may include one or more incandescent light sources (e.g., bulbs, lamps, etc.), fluorescent lamps, Compact Fluorescent Lamps (CFL), Cold Cathode Fluorescent Lamps (CCFL), high-intensity discharge sources, Light-Emitting Diodes (LEDs), or the like. Additionally or alternatively, lighting device 206 may include one or more adjustable lighting devices with variable intensity, brightness, luminance, color, tone, etc. Lighting or light sensor 207 may include one or more suitable sensor such as, for example, photoresistors, photodiodes, etc. In various implementations, camera 205 may serve as light sensor 207, and light sensor 207 may be absent.

Furthermore, it should be noted that, outside of correctional facilities, video visitation device 103 may assume the form of any computer, tablet computer, smart phone, etc., or any other consumer device or appliance with videoconferencing capabilities. For example, in the case where video visitation device 103 is a camera-enabled television (or smart phone, etc.) that does not include a dedicated lightning apparatus, the brightness of display 204 may be adjusted so that display 204 may itself act as lighting device 206 (e.g., the brightness of display 204 may be increased to also increase the illumination of the person(s) "watching" the teleconference through the television, for example, upon detection that a video connection has been established).

In the context of correctional facilities, video visitation device 103 may include one or more tampering/impact resistant or hardened elements configured to protect them from vandalism or otherwise destructive acts. For example, one or more of devices 202-207 may be protected by a transparent plastic or thermoplastic (e.g., Plexiglas, etc.) material.

Figure 3:
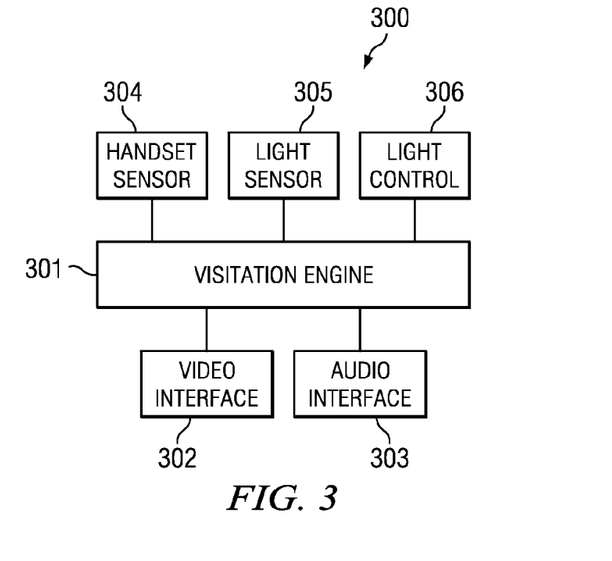
FIG. 3 is a block diagram of video visitation software according to some embodiments.

FIG. 3 is a block diagram of video visitation software 300. In some embodiments, software 300 may be executed, at least in part, by video visitation device 103 shown in FIG. 2. As illustrated, software 300 may include visitation engine 301, video capture/reproduction interface 302, audio capture/reproduction interface 303, and light control module 306. Other modules not shown in FIG. 3 for sake of brevity may include, but are not limited to, a user interface module (configured to allow a user to interact with software 300 and/or visitation system 130) and an AMS interface (configured to allow software 300 to access information stored in database 115).

In various embodiments, visitation engine 301 may be configured to perform video visitation operations such as, for example, authenticate the identity of an inmate and exchange one or more messages with communication system 101, visitation system 130, and or devices 112 or 113 over network 110 to initiate a video visitation session. During a video visitation session, engine 301 may utilize video interface 302 and audio interface 303 modules to provide an inmate with video and/or audio produced by a non-resident, and to provide the non-resident with video and/or audio captured from the inmate.

Generally speaking, video visitation engine 301 may be configured to turn on lighting device 206 once a video connection is made between the resident and non-resident or vice versa. Light sensor module 305 may obtain a lighting characteristic (e.g., intensity, brightness, luminance, color, tone, etc.) of the environment where device 103 is located (e.g., via camera 205 and/or sensor 207). Light control module 306 may be used to interface video visitation engine 301 with lighting device 206. In some cases, for example, light control module 306 may receive a command from video visitation engine 301 indicating one or more lighting parameters to be applied to lighting device 206 during a video visitation session.

Operation of visitation software 300 is described in detail in connection with the example shown in FIG. 5. In certain embodiments, each of the different components of visitation software 300 may be implemented in software, hardware or a suitable combination thereof, in an integrated fashion (e.g., on a single server or computer system) or in a distributed fashion (e.g., via a number of discrete systems configured to communicate with one another via a network). Additionally or alternatively, the operation of visitation software 300 may be partitioned into components in a different fashion than illustrated in FIG. 3.

Figure 4:
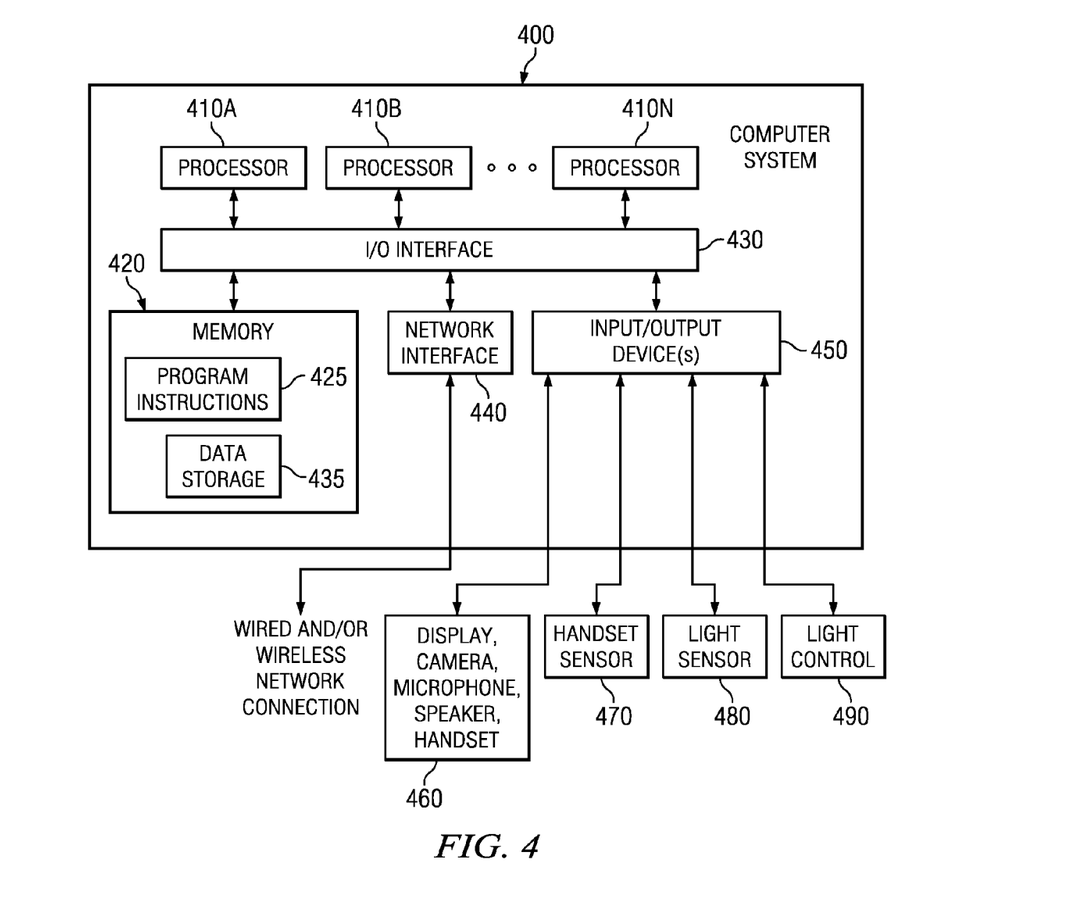
FIG. 4 is a block diagram of a computer system configured to implement various systems and methods described herein according to some embodiments.

As noted above, embodiments of systems and methods for providing software-controlled lighting for video visitation devices may be implemented or executed, at least in part, by one or more computer systems. One such system is illustrated in FIG. 4. In various embodiments, system 400 may be a server, a workstation, a desktop computer, a laptop, a tablet computer, a mobile device, a smart phone, or the like. In some cases, system 400 may be used to implement video visitation device 103. As illustrated, computer system 400 includes one or more processors 410A-N coupled to a system memory 420 via an input/output (I/O) interface 430. Computer system 400 further includes a network interface 440 coupled to I/O interface 430, and one or more input/output devices 450, such as display, camera, microphone, speaker and/or handset circuits 460, handset sensor circuit 470, light sensor circuit 480, and/or light control circuit 490.

Display, camera, microphone, speaker and/or handset circuits 460 may include one or more analog, digital and/or integrated circuits configured to control one or more aspects of the operation of display 204, camera 205, handset sensor 208, microphone 203 (or within handset 201), and/or speaker 202 (or within handset 201). Similarly, handset sensor circuit 470, light sensor circuit 480, and/or light control circuit 490 may include one or more analog, digital and/or integrated circuits configured to control one or more aspects of the operation of handset sensor 208, light sensor 207, and/or lighting device 206, respectively. Other I/O devices 450 may include, for example, keyboards, keypads, touchpads, scanning devices, voice or optical recognition devices, mobile devices, any other device suitable for entering or retrieving data, etc.

In some embodiments, video visitation device 103 may be implemented using a single instance of computer system 400, while in other embodiments multiple such systems, or multiple nodes making up computer system 400, may be configured to host different portions of video visitation device 103. In various embodiments, computer system 400 may be a single-processor system including one processor 410A-N, or a multi-processor system including two or more processors 410A-N (e.g., two, four, eight, or another suitable number). Processors 410A-N may be any processor capable of executing program instructions. For example, in various embodiments, processors 410A-N may be general-purpose or embedded processors implementing any of a variety of instruction set architectures (ISAs), such as the x86, PowerPC®, or ARM® ISAs, or any other suitable ISA. In multi-processor systems, each of processors 410A-N may commonly, but not necessarily, implement the same ISA. Also, in some embodiments, at least one processor 410A-N may be a graphics processing unit (GPU) or other dedicated graphics-rendering device(s).

System memory 420 may be configured to store program instructions and/or data accessible by processor(s) 410A-N. In various embodiments, system memory 420 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described below in connection with FIG. 5, may be stored within system memory 420 as program instructions 425 and data storage 435, respectively. In other embodiments, program instructions and/or data may be received, sent or stored upon different types of computer-accessible media or on similar media separate from system memory 420 or computer system 400. Generally speaking, a computer-accessible medium may include any tangible storage media or memory media such as electronic, magnetic, or optical media—e.g., disk or CD/DVD-ROM coupled to computer system 400 via I/O interface 430. Program instructions and data stored on a tangible computer-accessible medium in non-transitory form may further be transmitted by transmission media or signals such as electrical, electromagnetic, or digital signals, which may be conveyed via a communication medium such as a network and/or a wireless link.

In one embodiment, I/O interface 430 may be configured to coordinate I/O traffic between processor(s) 410A-N, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor(s) 410A-N). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. In addition, in some embodiments some or all of the functionality of I/O interface 430, such as an interface to system memory 420, may be incorporated directly into processor(s) 410A-N.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as FibreChannel SANs, or via any other suitable type of network and/or protocol. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

As shown in FIG. 4, memory 420 may include program instructions 425, configured to implement certain embodiments described herein, and data storage 435, comprising various data may be accessible by program instructions 425. In an embodiment, program instructions 425 may include software elements of embodiments illustrated in the above figures. For example, program instructions 425 may be implemented in various embodiments using any desired programming language, scripting language, or combination of programming languages and/or scripting languages (e.g., C, C++, C#, Java™, JavaScript™, Perl, etc.). Data storage 435 may include data that may be used in these embodiments (e.g., recorded communications, profiles for different modes of operations, etc.). In other embodiments, other or different software elements and data may be included.

A person of ordinary skill in the art will appreciate that computer system 400 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Figure 5:
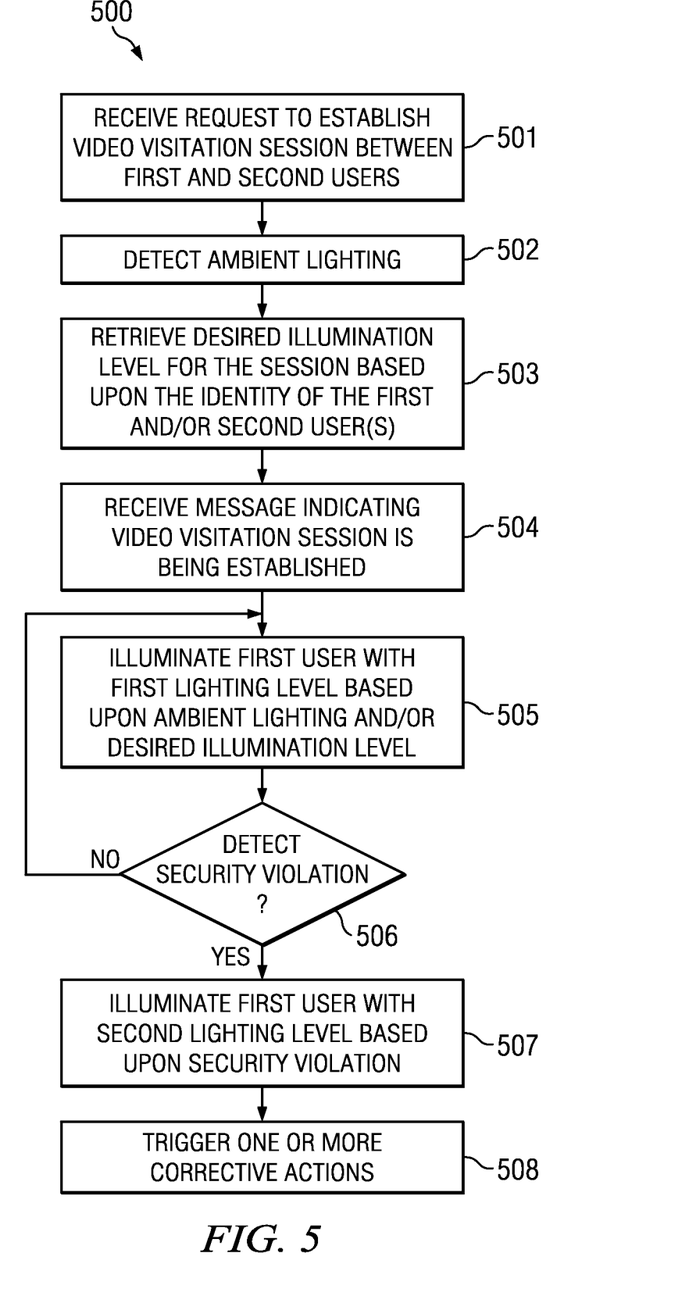
FIG. 5 is a flowchart of a method for providing software-controlled lighting for video visitation devices according to some embodiments.

FIG. 5 is a flowchart of a method for providing software-controlled lighting for video visitation devices. In some embodiments, method 500 may be implemented, at least in part, by video visitation device 103 described above. As illustrated, at block 501, method 500 may receive a request to establish a video visitation session between a first user (e.g., an inmate or resident of a controlled-environment facility) and a second user (e.g., a non-resident party outside of the inmate's facility). For example, the inmate may interact with display 204 (or a keyboard, pointing device, etc.) to indicate his or her readiness for the session. Additionally or alternatively, the inmate may pick-up handset 201, thus triggering a signal that the inmate is ready to initiate a videoconference. Additionally or alternatively, the request for video visitation may be received from the non-resident party over network 110. Any suitable method for requesting that the video visitation be established may be used in accordance with the controlled-environment facility's protocols. For example, in some cases, at block 501, the inmate may provide an indication of his or her identification (e.g., ID number, code, Personal Identification Number (PIN)). Otherwise, system 103 may be equipped with a Radio Frequency (RF) receiver (not shown in FIG. 2) configured to read the inmate's Radio-Frequency Identification (RFID) tag, bracelet, or the like.

At block 502, method 500 may detect an ambient lighting. For example, camera 205 and/or light sensor 207 may detect natural level(s) or light intensity, brightness, luminance, color, tone, etc. around video visitation device 103. At block 503, method 500 may retrieve a desired or preselected illumination level or quality for the requested video visitation session based upon the identity of the first and/or second parties. For example, visitation engine 301 executed by video visitation device 103 may retrieve a predetermined level of lighting for a particular inmate from database 115. Additionally or alternatively, video visitation device 103 may retrieve a predetermined level of lighting for a particular non-resident party.

At block 504, method 500 may receive a message indicating that the video visitation is being established. For example, visitation engine 301 executed by video visitation device 103 may receive from non-resident device(s) 113 and/or 114 or from video visitation system 130, over network 110, a packet indicating that the video visitation session has been or is being set up. Generally, such a packet or message may include and/or may be accompanied by a video and/or audio feed. More generally, block 504 may involve any suitable software-based determination that the video visitation is being established—e.g., in contrast with a detection of handset 201's "off-hook" status, and which is therefore independent of the physical position of handset 201.

At block 505 and in response to the software-based determination of block 504, method 500 may illuminate the first user with a first lighting level based upon the ambient lighting detected at block 502 and/or the predetermined illumination levels retrieved at block 503. For example, visitation engine 301 executed by video visitation device 103 may control lighting device 206 to output a light with a desired intensity, brightness, luminance, color and/or tone. Light sensor 207 (or camera 205) may determine that a given amount of light is already present in around device 103, and device 103 may control lighting device 206 to output the difference between the existing and desired illumination levels accordingly, thus reducing over illumination and/or underexposure effects (e.g., with regard to the inmate's or non-resident's predetermined levels, if any). Additionally or alternatively, light sensor 207 (or camera 205) may determine that the ambient light has a given "shade of white," and may control lighting device 206 to output light with a frequency or set of frequencies suitable to effect a color correction operation, a while balancing operation, or the like. In some cases, at some time between execution of blocks 501 and 505, method 500 may also include progressively illuminating the inmate from a first lighting level (e.g., an ambient level) to a second lighting level (e.g., a desired lighting level) through one or more intermediate levels, the second lighting level providing more illumination than the first lighting level.

At block 506, method 500 determines whether a security violation has taken place. For example, visitation engine 301 may be configured to perform one or more image recognition operations to determine that one of the parties participating in the video visitation (i.e., the inmate and/or the non-resident party) has broken a video visitation rule enforced by the facility. For instance, visitation engine 301 may determine that a party has gestured excessively and/or inappropriately, attempted to communicate via sign language, used other physical signing (e.g., gang signs, moving of the head or blinking in code, etc.), or the like. Additionally or alternatively, visitation engine 301 may determine that a party has introduced a prohibited or foreign object into the video visitation session (e.g., a threatening object, a price of paper with writing on it, etc.), that a face or person is missing from one end of the video visitation session, that a greater number of parties is participating in the video visitation session than previous authorized, etc. If no such violations are detected, control returns to block 505.

Otherwise, at block 507, method 500 may illuminate the first user (e.g., the inmate) with a second lighting level different from the first lighting level and/or based upon the detected violation. For example, visitation engine 301 executed by video visitation device 103 may control lighting device 206 to output a light with higher intensity (e.g., to better record a video of the inmate, to alert the inmate of the potential infraction, to blind the inmate from seeing the non-resident party, to overexpose the inmate and make it difficult for the non-resident to see the inmate's gesturing, object, etc.) or lower intensity (e.g., also to prevent the non-resident party from seeing the inmate's gesturing, object, etc.). In some implementations, the choice between outputting a light with higher or lower intensity may depend, at least in part, upon the ambient lighting. For instance, if natural light in the visitation area allows the non-resident to see the inmate's gesturing or other violation, then video visitation device 103 may choose to employ an overexposure or over illumination technique. However, if the ambient light in the visitation area is sufficiently dim such that the non-resident can only see the inmate's violation due to the use of lighting device 206, then video visitation device 103 may reduce (or turn off) the output of lighting device 206 in response to the violation.

At block 508, video visitation device 103 may trigger or initiate one or more other corrective actions. For instance, as noted above, video visitation device 103 may begin to record the session and/or patch a live feed to an operator for live monitoring of the session. Depending upon the corrective action and/or detected violation, the changes between the first and second lighting levels may be sudden (to indicate to one of the parties that the violation was detected) or incremental (to avoid detection by the parties and therefore allow the violation to continue for evidentiary purposes or the like).

In some embodiments, after the video visitation session has been established, one or more controls may be provided to the non-resident party such that the non-resident party may alter the illumination of the inmate. For example, at block 503, video visitation device 103 may also retrieve an indication of whether the non-resident party is permitted to change one of more parameters involved in the illumination of the inmate. If so permitted, then a software control (e.g., a web-based control, applet, etc.) provided by video visitation device 103 and/or visitation system 130 and executed by the non-resident's device (e.g., device 113) may allow the non-resident to change the intensity, brightness, luminance, color, tone, etc. of the inmate's illumination during the visitation session by remotely controlling lighting device 206.

The various systems and methods illustrated in the figures and described herein represent example embodiments of systems and methods for providing software-controlled lighting for video visitation devices. The methods may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
performing, by a computer-based video visitation system:
receiving a message over a network indicating that a video visitation session is being established between at least a first user and a second user;
illuminating at least one of the users in response to the message;
detecting a security violation in one or more video images captured during the video visitation session, wherein the security violation includes the presence of one or more of: gesturing, signing, or an object;
determining an amount of lighting to be emitted by a lighting device operably coupled to the computer-based video visitation system as a function of the security violation; and
controlling the lighting device to produce the determined amount of lighting.

2. The method of claim 1, wherein the network includes an Internet Protocol (IP) network or an Integrated Services Digital Network (ISDN).

3. The method of claim 2, wherein the message includes or is accompanied by a video or audio packet.

4. The method of claim 1, wherein illuminating the at least one of the users includes activating one or more light-emitting diode (LEDs).

5. The method of claim 1, wherein illuminating the at least one of the users includes progressively illuminating the user from a first lighting level to a second lighting level through one or more intermediate levels, the second lighting level providing more illumination than the first lighting level.

6. The method of claim 1, further comprising:
performing, by the computer-based video visitation system:
detecting an amount of ambient light present in a video visitation area;
in response to the detection, determining an amount of lighting to be emitted by a lighting device during the video visitation session; and
controlling the lighting device to produce the determined amount of lighting.

7. The method of claim 6, wherein detecting the amount of ambient light present in the video visitation area occurs at least in part in response to a determination, by the computer-based video visitation system, that the first user has picked up a handset operably coupled to the computer-based video visitation system.

8. The method of claim 1, wherein the first user is at least one resident of a controlled-environment facility, and wherein the second user is at least one non-resident of the controlled-environment facility.

9. The method of claim 1, wherein the first user is at least one non-resident of the controlled-environment facility and the second user is at least one resident of a controlled environment facility.

10. The method of claim 1, further comprising:
performing, by the computer-based video visitation system:
receiving a request from the second user to increase or decrease the illumination of the first user; and
in response to the request, increasing or decreasing the illumination.

11. A tangible computer-readable storage medium having program instructions stored thereon that, upon execution by a computer-based video visitation system, cause the computer-based video visitation system to:

determine that a video visitation session is being set up between at least one inmate within a correctional facility and at least one non-resident party, wherein the determination is made independently of a physical position of a telephone handset operably coupled to the computer-based video visitation system;

illuminate the at least one inmate in response to the determination; and change the illumination of the at least one inmate in response to an identity of the at least one inmate or the at least one non-resident party.

12. A tangible computer-readable storage medium having program instructions stored thereon that, upon execution by a computer-based video visitation system, cause the computer-based video visitation system to:

determine that a video visitation session is being set up between at least one inmate within a correctional facility and at least one non-resident party, wherein the determination is made independently of a physical position of a telephone handset operably coupled to the computer-based video visitation system;

illuminate the at least one inmate in response to the determination; and change the illumination of the at least one inmate in response to one or more video images captured during the video visitation session indicating a correctional facility security violation.

13. A video visitation system, comprising:

at least one processor; and a memory coupled to the at least one processor, the memory configured to store instructions executable by the at least one processor to cause the video visitation system to:

make a software-based determination that a video visitation session is being established between at least one inmate of a correctional facility and at least one non-resident of the correctional facility; and provide a first amount of lighting to illuminate the at least one inmate in response to the software-based determination, and wherein the first amount of lighting is determined based, at least in part, upon an identification of the at least one inmate or the at least one non-resident.

14. A video visitation system, comprising:

at least one processor; and a memory coupled to the at least one processor, the memory configured to store instructions executable by the at least one processor to cause the video visitation system to:

make a software-based determination that a video visitation session is being established between at least one inmate of a correctional facility and at least one non-resident of the correctional facility;

provide a first amount of lighting to illuminate the at least one inmate in response to the software-based determination;

detect one or more video images captured during the video visitation session; and in response to the detection, provide a second amount of lighting different from the first amount of lighting, wherein the one or more video images indicate the presence of one or more of: gesturing by the at least one inmate, gesturing by the at least one non-resident, signing by the at least one inmate, or signing by the at least one non-resident.

15. A tangible computer-readable storage medium having program instructions stored thereon that, upon execution by a computer-based video visitation system, cause the computer-based video visitation system to:

determine that a video visitation session is being set up between at least one inmate within a correctional facility and at least one non-resident party outside of the correctional facility, wherein the determination is made independently of a physical position of a telephone handset operably coupled to the computer-based video visitation system;

illuminate the at least one inmate in response to the determination; and change the illumination of the at least one inmate in response to an identity of the at least one inmate or the at least one non-resident party.

* * * * *